United States Patent
Ko et al.

(10) Patent No.: US 9,246,937 B2
(45) Date of Patent: Jan. 26, 2016

(54) NETWORK ACCESS CONTROL SYSTEM AND METHOD

(75) Inventors: Bo-Seung Ko, Gyeonggi-Do (KR);
Sung-Eun Kim, Gyeonggi-Do (KR);
Sang-Hoon Kim, Seoul (KR);
Myung-Su Park, Seoul (KR)

(73) Assignee: INCA Internet Co., Ltd., Seoul (KR)

( * ) Notice: Subject to any disclaimer, the term of this patent is extended or adjusted under 35 U.S.C. 154(b) by 82 days.

(21) Appl. No.: 14/127,199

(22) PCT Filed: Apr. 26, 2012

(86) PCT No.: PCT/KR2012/003215
§ 371 (c)(1),
(2), (4) Date: Dec. 18, 2013

(87) PCT Pub. No.: WO2012/176978
PCT Pub. Date: Dec. 27, 2012

(65) Prior Publication Data
US 2014/0157366 A1 Jun. 5, 2014

(30) Foreign Application Priority Data
Jun. 23, 2011 (KR) .................. 10-2011-0061162

(51) Int. Cl.
*H04L 29/06* (2006.01)
*G06F 21/55* (2013.01)

(52) U.S. Cl.
CPC .......... *H04L 63/1441* (2013.01); *G06F 21/554* (2013.01); *H04L 63/0227* (2013.01)

(58) Field of Classification Search
CPC ............ H04L 63/0227; H04L 63/1441; G06F 21/554

USPC .......................................................... 726/3
See application file for complete search history.

(56) References Cited

U.S. PATENT DOCUMENTS

| 2008/0040800 | A1 | 2/2008 | Park |
| 2009/0199297 | A1 | 8/2009 | Jarrett et al. |
| 2010/0169973 | A1 | 7/2010 | Kim et al. |

FOREIGN PATENT DOCUMENTS

| KR | 10-0468374 B1 | 1/2005 |
| KR | 10-0645983 B1 | 11/2006 |
| KR | 10-2010-0078081 A | 7/2010 |
| KR | 10-2010-0113802 A | 10/2010 |
| KR | 10-2011-0001426 A | 1/2011 |

OTHER PUBLICATIONS

Int'l Search Report issued Nov. 29, 2012 in Int'l Application No. PCT/KR2012/003215.

*Primary Examiner* — Kambiz Zand
*Assistant Examiner* — Aubrey Wyszynski
(74) *Attorney, Agent, or Firm* — Panitch Schwarze Belisario & Nadel LLP

(57) ABSTRACT

The present invention relates to a system and method for controlling a network access of a network packet on the basis of a thread which is inserted into a process through code injection. The network access control system according to the present invention comprises: a process inspecting unit for detecting a code injection-based thread included in a process; and a network monitoring unit for performing network filtering so as to detect a network packet having access to a network, and, if a communication subject of the detected network packet is the code injection-based thread, blocking the traffic of the detected network packet.

24 Claims, 9 Drawing Sheets

<Prior Art>

<Prior Art>

FIG. 5

| Address | Description |
|---|---|
| 0x00000000 | |
| 0x00010000 | Type: Mapped, Protect: READWRITE |
| 0x0001f000 | |
| 0x00030000 | Type: Private, Protect: READONLY |
| 0x00033000 | |
| 0x00050000 | Type: Mapped, Protect: READONLY |
| 0x000b6000 | |
| 0x001d0000 | Type: Private, Protect: READWRITE |
| 0x0020f000 | |
| 0x010d0000 | Type: Mapped Exe, Protect: EXEWRITECOPY |
| 0x010d4000 | |
| 0x76f80000 | Type: Mapped Exe, Protect: EXEWRITECOPY |
| 0x770bb000 | |
| 0x7ffb0000 | Type: Mapped Exe, Protect: EXEWRITECOPY |
| 0x7ffd2000 | |
| | ... |
| 0xffffffff | |

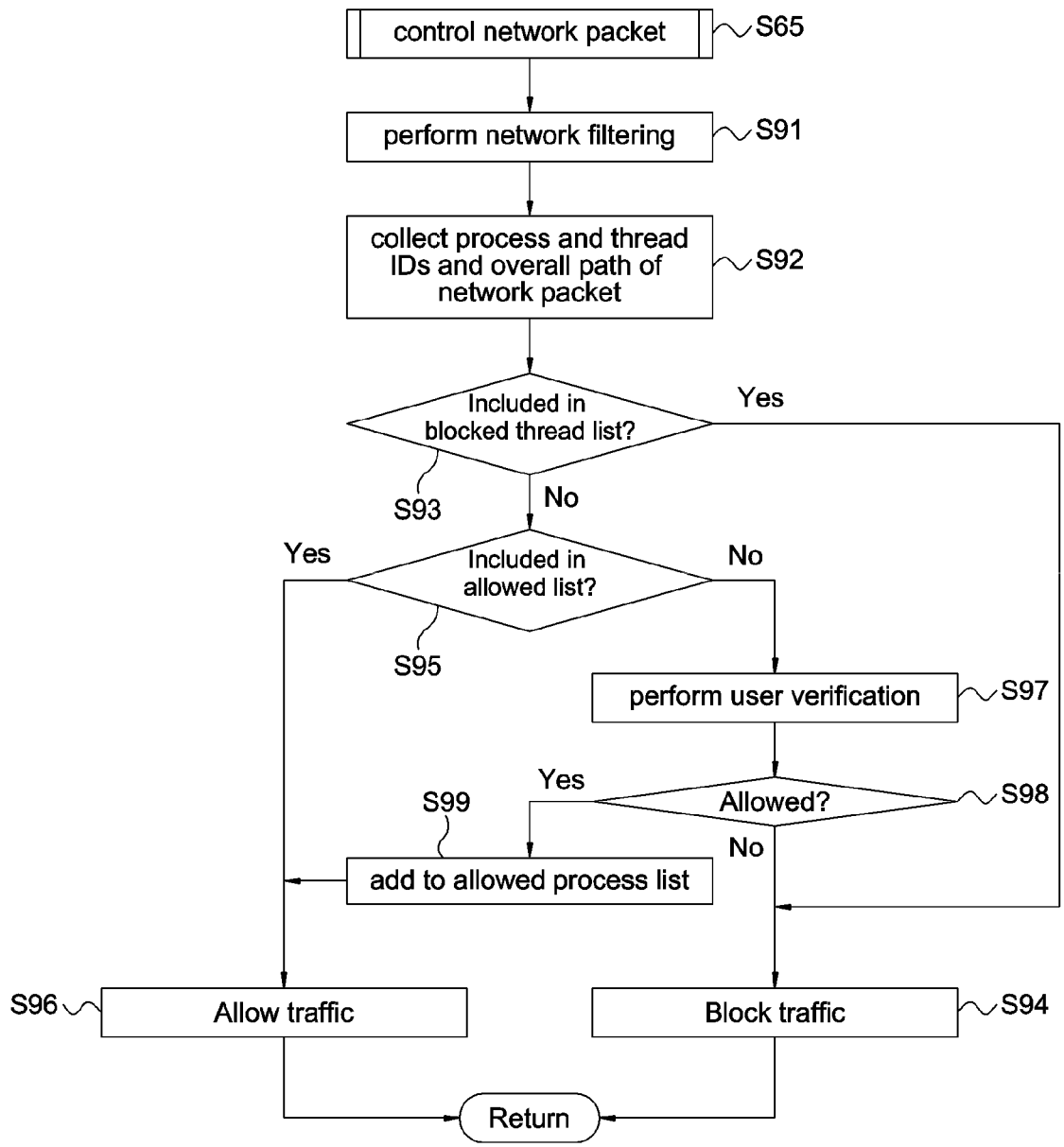

NETWORK ACCESS CONTROL SYSTEM AND METHOD

CROSS-REFERENCE TO RELATED APPLICATION

This application is a Section 371 of International Application No. PCT/KR2012/003215, filed Apr. 26, 2012, which was published in the Korean language on Dec. 27, 2012, under International Publication No. WO 2012/176978 A2, and the disclosure of which is incorporated herein by reference.

TECHNICAL FIELD

The present invention relates to a network access control system and method and, more particularly, to a system and method that control network access based on a thread inserted based on code injection.

BACKGROUND ART

The Internet is a network that uses Transmission Control Protocol/Internet Protocol (TCP/IP). With the development of Internet technology, the area of use of the Internet has extended, and thus individuals and general enterprises access the Internet, acquire various types of information, and use the acquired information for their business. However, despite the advantage of the acquisition of information, a variety of types of hacking programs, such as computer viruses, spread across the Internet, and computer viruses, etc. intrude into networks connected to the Internet, so that systems using the Internet are attacked.

As a security technology for preventing illegal intrusion into a system, Microsoft Corporation has basically provided, starting with their Windows XP operating system, an Internet Connection Firewall (ICF) for protecting a computer or a network from intrusion.

An ICF is a security technology that prevents traffic not desired by a computer user from entering a computer from the outside or exiting from a computer to the outside. For this purpose, the ICF constructs a communication-allowed list in the form of a table, tracks an inbound packet (a packet entering a computer from the outside) and an outbound packet (a packet exiting from a computer to the outside) using network filtering technology, and compares those packets with the communication-allowed list. The ICF allows the traffic of a corresponding packet if the corresponding packet is included in the communication-allowed list, and blocks the traffic of the corresponding packet if the corresponding packet is not included in the communication-allowed list. In this case, the process ID and path of a process for which communication has been allowed by a user are stored in the communication-allowed list.

FIG. 1 is an operation flowchart illustrating a conventional method of blocking network access in an ICF.

The ICF analyzes the process information (the process ID and path) of a process that transmits or receives a network packet at step S11. If the corresponding process ID and path are included in a communication-allowed list at step S12, the traffic of the corresponding packet is allowed at step S13. However, if the corresponding process ID and path are not included in the communication-allowed list at step S12, a user is requested to verify whether to allow a packet that is transmitted or received by the corresponding process at step S14. If the user allows the transmission of the packet at step S15, the process ID and path of the corresponding process are included in a communication-allowed list at step S16, and the traffic of the corresponding packet is allowed at step S13. Meanwhile, if the user does not allow the transmission of the packet at step S15, the traffic of the corresponding packet is blocked at step S17.

This conventional method of blocking network access in an ICF has the problem of being unable to block packet traffic when a hacker inserts malware into a process for which communication has been allowed and the malware operates and generates the packet traffic because the conventional method selectively allows and blocks packet traffic based on a process ID.

This will now be described in greater detail.

In general, Internet Explorer (iexplore.exe) is a Web browser program that is widely used under the Windows operating system (OS). Internet Explorer frequently generates traffic, such as an outbound packet or an inbound packet. Accordingly, if the verification of the transmission of a packet generated by Internet Explorer is requested, a user would allow the transmission without particular doubt. In this case, both an outbound packet that Internet Explorer sends to the outside and an inbound packet that is sent from the outside to Internet Explorer are allowed without the additional verification of the user.

Meanwhile, a program, such as Trojan or Zeus, injects malicious code into a process through code injection, and enables the malicious code to generate a thread. Recently, a financial incident occurred in which malicious code inserted into a user computer by a Zeus program divulged financial information, such as bank accounts and passwords, stored in a computer to a hacker and then the hacker accessed the bank accounts of small- and medium-sized enterprises and local autonomous entities using the financial information and then withdrew money therefrom.

For example, it is assumed that, as illustrated in FIG. 2, as malicious code is inserted into Internet Explorer, a thread is generated based on malicious code, and the malicious thread Thread 3 attempts to maliciously divulge information. In this case, an ICF searches a communication-allowed list using a process ID (that is, Internet Explorer iexplore.exe) and then controls the network access of Internet Explorer. That is, if Internet Explorer has been included in the communication-allowed list, the malicious divulgence of information via the malicious thread is allowed. In contrast, if Internet Explorer has not been included in the communication-allowed list, the malicious divulgence of information via the malicious thread is blocked. It will be apparent that the ICF controls the network access of normal packets via other normal threads of Internet Explorer based on process IDs.

Accordingly, if the user allows Internet Explorer to perform network access, the user can access the Internet without inconvenience because normal packet transmission via other normal threads is smoothly performed, but security becomes vulnerable because the network access of a malicious thread included in Internet Explorer is also allowed.

In contrast, if the user does not allow the network access of Internet Explorer, the malicious divulgence of information via a malicious thread can be prevented, but the user has serious trouble using the Internet because normal packet transmission via other normal threads is also blocked.

DISCLOSURE

Technical Problem

An object of the present invention that has been made keeping in mind the above problems occurring in the prior art is to provide a network access control system and method that selectively block and allow the traffic of a network packet based on not only a process ID but also a thread ID, thereby improving the convenience of a user and the strength of security.

Technical Solution

In accordance with the present invention provides, there is provided a network access control system, including a process inspection unit configured to detect a code injection-based thread included in a process; and a network monitoring unit configured to detect a network packet accessing a network by performing network filtering, and to, if the agent of communication of the detected network packet is a code injection-based thread, block the traffic of the detected network packet.

In addition, in accordance with the present invention provides, there is provided a network access control method, including step 1 of collecting, by a network access control system, information about one or more processes being executed on a computer; step 2 of detecting, by the network access control system, a code-injected virtual address space area included in the collected processes; step 3 of detecting, by the network access control system, whether a code injection-based thread is present in the code-injected virtual address space; step 4 of collecting, by the network access control system, traffic of at least one network packet by performing network filtering; and step 5 of selectively allowing and blocking, by the network access control system, the traffic of the network packet based on the code injection-based thread information.

Advantageous Effects

As described above, in accordance with the present invention, there is an advantage in that the malicious divulgence of information via a malicious thread generated by malware injected into a process based on code injection can be blocked in real time. Furthermore, allowance or blocking even for the same process is determined for each thread, thereby allowing the normal network access of a normal thread and blocking the malicious network access of a malicious thread, so that there is an advantage in that the convenience of a user and the strength of security are improved.

DESCRIPTION OF DRAWINGS

FIG. 5 is a diagram illustrating a memory structure representative of the Vad tree structure of the process of FIG. 4;

FIG. 9 is an operation flowchart illustrating step S65 of controlling a network packet using the code injection-based thread information detected at step S63 of FIG. 6 in detail.

Figure 1:
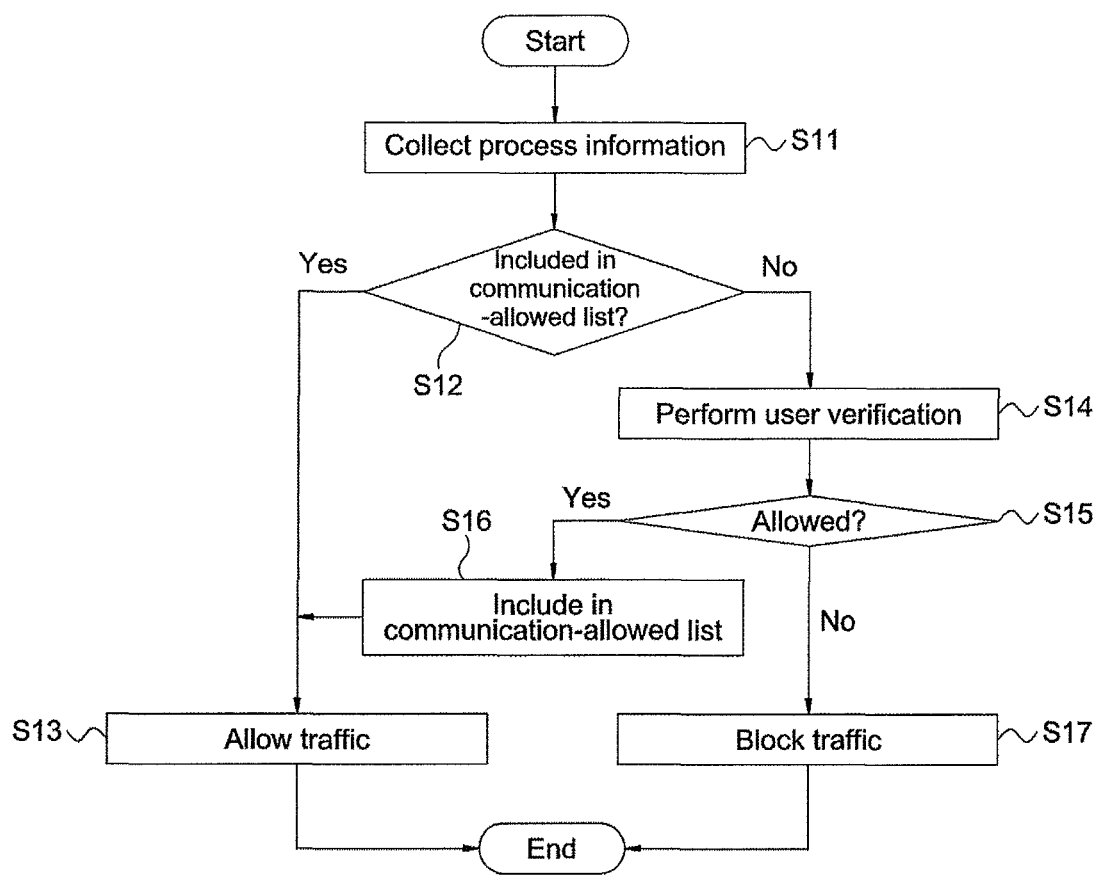
FIG. 1 is an operation flowchart illustrating a conventional method of blocking network access in an ICF.
Figure 2:
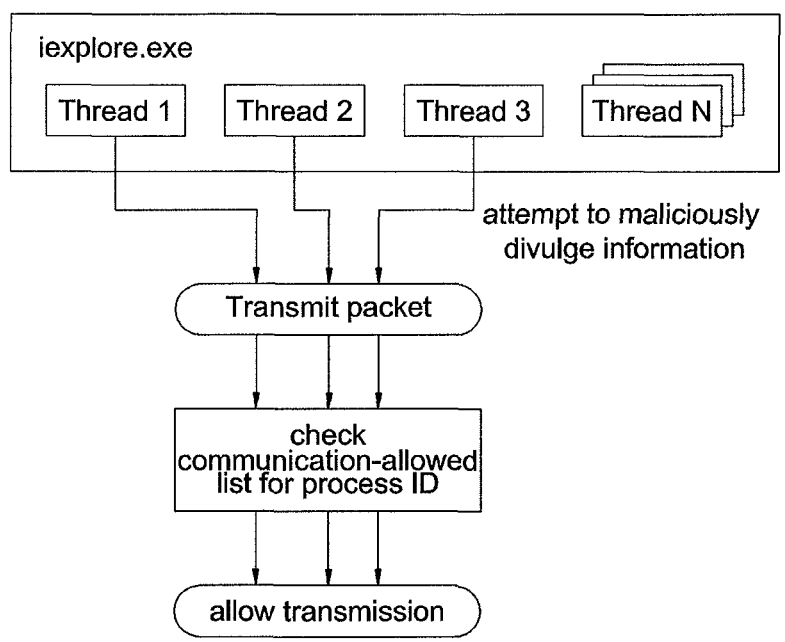
FIG. 2 is a diagram illustrating the problem of the conventional method of blocking network access.

| [Description of the Reference Numerals] | |
|---|---|
| 310: process inspection unit | 311: process information collection unit |
| 312: code injection detection unit | 313: code injection-based thread detection unit |
| 320: network monitoring unit | 321: network filter unit |
| 322: network blocking unit | |

BEST MODE

A network access control system and method according to the present invention will be described in detail below with reference to the accompanying drawings.

Figure 3:
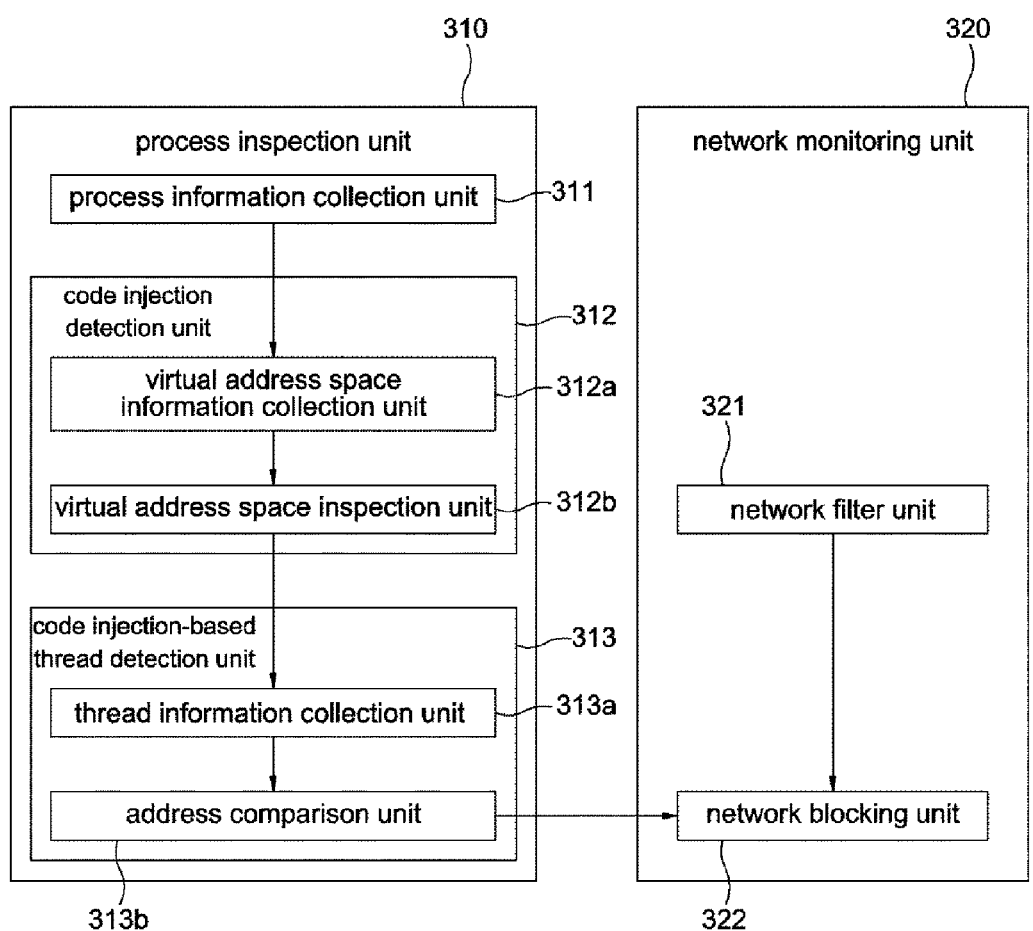
FIG. 3 is a configuration block diagram of a network access control system according to the present invention.

FIG. 3 is a configuration block diagram of a network access control system according to the present invention.

The network access control system according to the present invention includes a process inspection unit 310 configured to detect a code injection-based thread in a process, and a network monitoring unit 320 configured to detect a network packet approaching a network by performing network filtering and to, if the agent of communication of the detected network packet is a code injection-based thread, block the transmission of the detected network packet.

The process inspection unit 310 includes a process information collection unit 311 configured to collect information about one or more processes being executed on a computer, a code injection detection unit 312 configured to detect a code-injected area in each of the processes collected by the process information collection unit, and a code injection-based thread detection unit 313 configured to detect a thread generated based on the code-injected area.

The network monitoring unit 320 includes a network filter unit 321 configured to detect a network packet by performing network filtering, and a network blocking unit 322 configured to selectively allow and block the transmission of the network packet based on the process and thread IDs of the agent of communication (transmission or reception) of the network packet.

The process information collection unit 311 collects process information by collecting an EProcess structure for each process being executed on the computer. The method by which the process information collection unit 311 collects process information for each process may include various methods, including a method of enumerating processes using the EnumProcesses function of psapi.dll and then collecting an EProcess structure for each process, a method of acquiring process information using a ZwQuerySystemInformation function and then collecting an EProcess structure for each process, a method of collecting an EProcess structure for each process by inspecting PspCidTable, that is, a kernel global variable, a method of collecting an EThread structure by inspecting PspCidTable, that is, a kernel global variable, and then collecting an EProcess structure via the process member of the EThread structure, a method of collecting the remaining EProcess structure for each process by inspecting the HandleTable of the EProcess structure of a certain process, a method of collecting the internal process information items of csrss.exe that manages each executed process, a method of collecting an EProcess structure for each process through memory scan using the scan memory-resident pattern of an EProcess structure, a method of collecting an EThread structure for each thread through memory scan using the memory-resident pattern of the EThread structure and then collecting an EProcess structure for each process via the process member of the collected EThread structure, etc.

The code injection detection unit 312 detects a code-injected area in each of the processes collected by the process information collection unit 311. The code injection detection unit 312 includes a virtual address space information collection unit 312a configured to collect virtual address space information assigned to each of the processes, and a virtual address space inspection unit 312b configured to inspect whether the collected virtual address space has been injected with code.

The method by which the virtual address space information collection unit 312a collects virtual address space information assigned to each process may include a method of inspecting the VadRoot member of an EProcess structure at a kernel level, and a method of using a VirtualQueryEx function user at a user level.

The method by which the virtual address space information collection unit 312a collects virtual address space information assigned to each process by inspecting the VadRoot member of an EProcess structure will now be described in detail. In this case, the term "Vad" refers to a virtual address descriptor. In general, a plurality of virtual address spaces is assigned to a single process. Each Vad represents a virtual address space assigned to a process.

The EProcess structure collected by the process information collection unit 311 is an object that is managed at a kernel level, and includes the internal information of each process. A VadRoot member is included in the EProcess structure. A VadRoot is a data structure in tree form, and manages memory address information assigned to a process.

Figure 4:
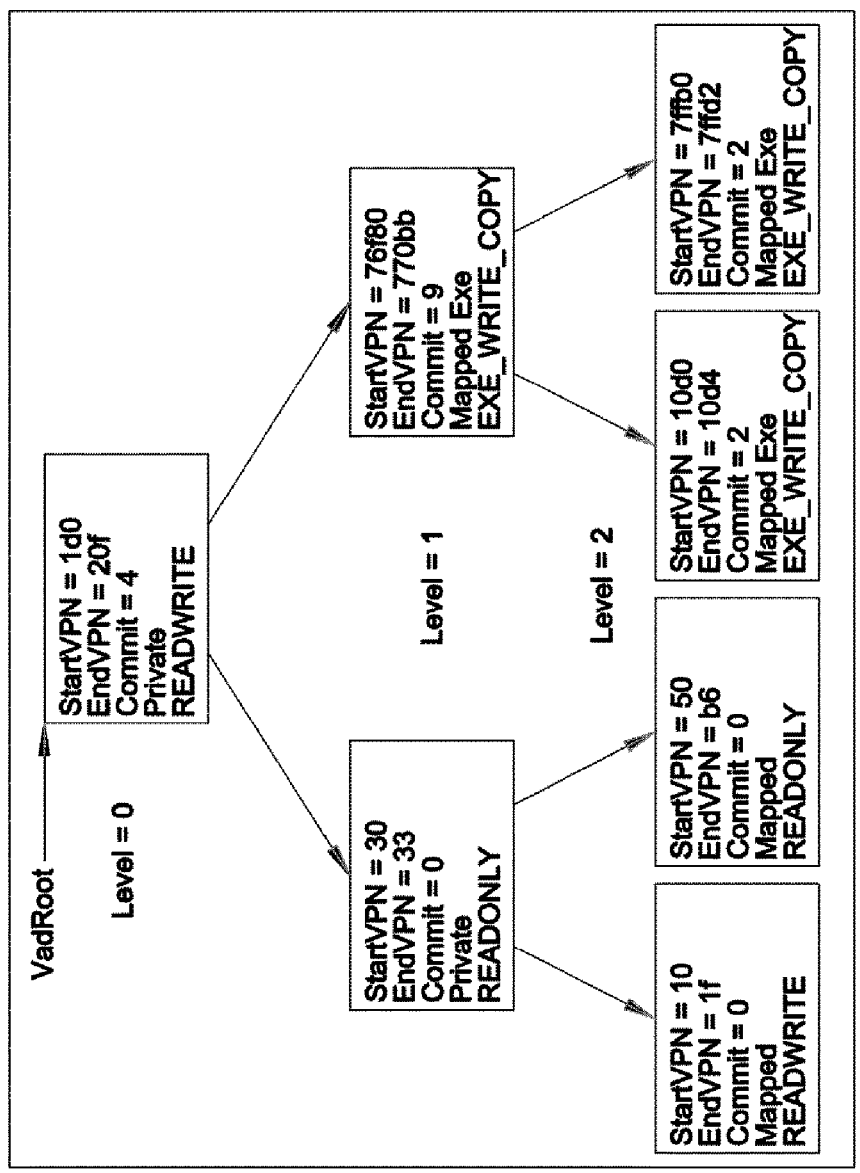
FIG. 4 is a diagram illustrating an example of the Vad tree structure of a certain process.

FIG. 4 is a diagram illustrating an example of the Vad tree structure of a certain process. In FIG. 4, each rectangular block corresponds to a single Vad, in which the start and end addresses StartVPN and EndVPN of the virtual page number (VPN) of a virtual address space, a memory type Private/Mapped Exe/Mapped, a protect flag value READWRITE/READONLY/EXE_WRITE_COPY are described. Based on the VadRoot of an EProcess structure, the virtual address space information collection unit 312a may perform collection while checking a virtual address range (start and end addresses) assigned to the virtual address space assigned to the process and its attributes (a memory type, and a protect flag value). FIG. 5 is a diagram illustrating a memory structure representative of the Vad tree structure of the process of FIG. 4.

Next, the method by which the virtual address space information collection unit 312a collects virtual address space information assigned to a process using a VirtualQueryEx function at a user level will now be described in detail. When a VirtualQueryEx function is used at a user level, information about a queried virtual address can be acquired. The query results of the VirtualQueryEx function are acquired in the form of a MEMORY_BASIC_INFORMATION structure. This MEMORY_BASIC_INFORMATION structure is similar to the above-described information acquired through the VadRoot. For each virtual address space assigned to a process, a virtual address range (start and end addresses) assigned to the corresponding virtual address space, and its attributes (a memory type, and a protect flag value) can be determined. The detailed way of using the VirtualQueryEx function can be found from the following links:

http://msdn.microsoft.com/en-us/library/aa366907v=vs.85.aspx http://msdn.microsoft.com/en-us/library/ms810627.aspx The virtual address space inspection unit 312b inspects whether the corresponding virtual address space has been code-injected using the attribute information of each virtual address space collected by the virtual address space information collection unit 312a. In the case of a DLL file that is normally inserted into a process and then loaded, the memory type of the virtual address space assigned to the DLL file is a mapped type and the protect flag value thereof is executable. Meanwhile, if the process has been code-injected, the memory type of the code-injected virtual address space is a private type, and the protect flag value thereof is executable.

Accordingly, if the memory type of a virtual address space assigned to a process is not a mapped type but a private type and the protect flag value thereof is executable, the virtual address space inspection unit 312b determines that the corresponding virtual address space is a code-injected area. The virtual address space inspection unit 312b transfers the virtual address range (start and end addresses) information of the virtual address space determined to be a code-injected area to the code injection-based thread detection unit 313.

The code injection-based thread detection unit 313 includes a thread information collection unit 313a configured to collect information about all threads being executed in each process, and an address comparison unit 313b configured to, if it is determined that the start address value of each of the collected threads falls within the virtual address range of the code-injected virtual address space by comparing the start address value (Win32StartAddress) of the collected thread with the virtual address range of the code-injected virtual address space provided by the virtual address space inspection unit 312b, determine that a code injection-based thread is present in the code-injected virtual address space.

A method by which the thread information collection unit 313a collects information about all threads being executed in a process may include various methods including a method of inspecting the ThreadListHead of an EProcess structure, and a method of using a ZwQuerySystemInformation function.

First, the method of inspecting the ThreadListHead of an EProcess structure will now be described. The EProcess structure is a structure including information about a process that is used at a kernel level, as described above. The ThreadListHead member of the EProcess structure includes information about all threads being executed in a process. The ThreadListHead member assumes a connection list form. An EThread structure may be acquired via each entry that is connected to the ThreadListHead member. The EThread structure is a structure including information about a thread that is used at a kernel level. Accordingly, the thread information collection unit 313a collects information about all threads present in the corresponding process by collecting and inspecting EThread structures through the ThreadListHead member.

Next, the method by which the thread information collection unit 313a collects thread information using a ZwQuerySystemInformation function will be described. The ZwQuerySystemInformation function is a function that is used to acquire system information. The type of information varies depending on SystemInformationClass. In the present invention, thread information for each process is acquired by setting SystemInformationClass to SystemProcessesAndThreadsInformation and then calling a ZwQuerySystemInformation function.

If the ZwQuerySystemInformation function has been successfully called, corresponding information may be accessed via SystemInformation. SystemInformation is a memory space containing information about all processes and thread information about each process. A SYSTEM_PROCESSES structure may be accessed through SystemInformation, and finally SYSTEM_THREADS present in array form may be acquired. Furthermore, a SYSTEM_PROCESSES structure area for a subsequent process may be found using the NextEntryDelta member of the SYSTEM_PROCESSES structure.

Thereafter, the address comparison unit 313b compares the start address value Win32StartAddress of a certain thread being executed in a process with the virtual address range of the code-injected virtual address space of the process. If the start address value of the collected thread falls within the virtual address range of the code-injected virtual address space, the address comparison unit 313b determines that the code injection-based thread is present, adds the process and thread IDs of the code injection-based thread to the blocked thread list, and then transfers the blocked thread list to the network blocking unit 322.

The network filter unit 321 monitors network packet traffic by performing common network filtering. As the network filtering method of the network filter unit 321, a network filter driver may be used as a kernel level. A method using a network filter driver includes various methods including an NDIS_OPEN_BLOCK hooking method, an Ndis Intermediate Driver implementation method, a TDI hooking method, and a method using a Windows Filtering Platform (WFP). Meanwhile, in a network filtering method of the network filter unit 321, network packet traffic may be monitored by hooking a socket function that is used by a specific process at a user level while targeting the corresponding specific process.

The network blocking unit 322 selectively allows and blocks the traffic of the corresponding network packet using the process and thread IDs of the agent of transmission or reception of the network packet. That is, the traffic of the network packet is blocked if the thread ID of the network packet is included in the blocked thread list, and the traffic of the network packet is allowed if the thread ID of the network packet is not included in the blocked thread list and the process ID of the network packet is included in the allowed process list. Meanwhile, if the process ID of the network packet is not included in the allowed process list, user verification is performed, and then the corresponding traffic is selectively allowed and blocked based on the results of the user verification.

The operation of the network access control system configured as described above will now be described.

Figure 6:
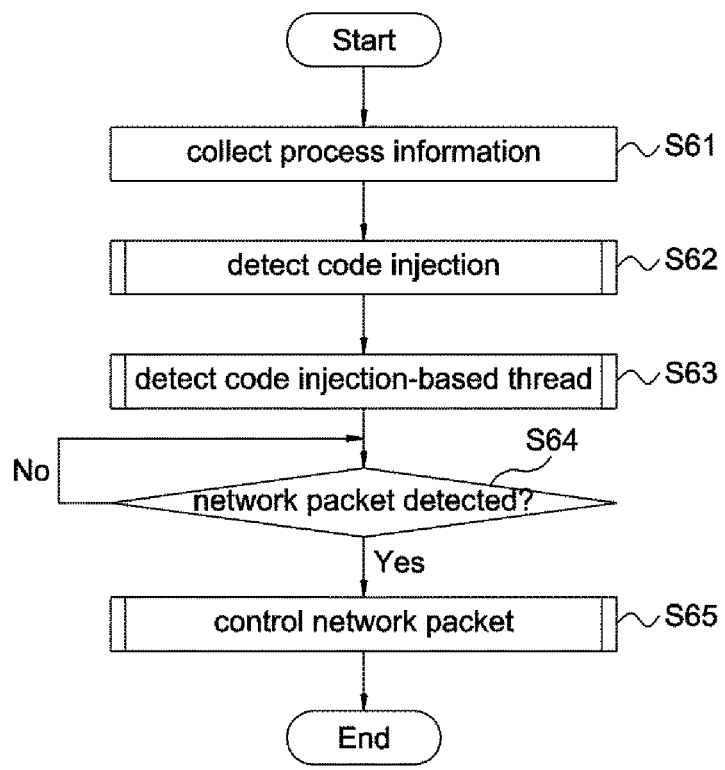
FIG. 6 is an operation flowchart illustrating a network access control method according to the present invention.

FIG. 6 is an operation flowchart illustrating a network access control method according to the present invention.

The network access control system according to the present invention collects information about one or more processes being executed on a computer at step S61. Thereafter, a code-injected virtual address space area is detected in each of the collected processes at step S62. Thereafter, it is detected whether a code injection-based thread is present in the code-injected virtual address space at step S63. Thereafter, if network packet traffic is detected at step S64, the network packet traffic is selectively allowed and blocked based on the code injection-based thread at step S65.

Figure 7:
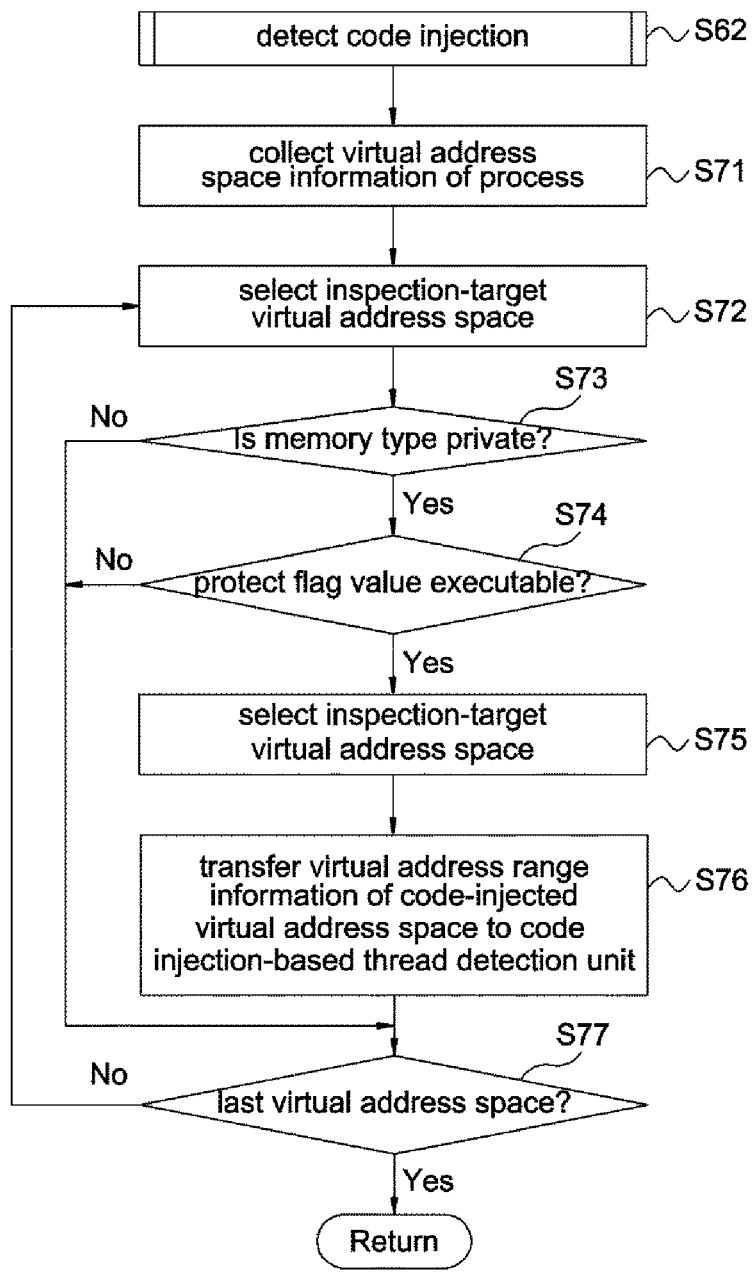
FIG. 7 is an operation flowchart illustrating step S62 of detecting the code-injected virtual address space area of a certain process, which is illustrated in FIG. 6, in detail.

FIG. 7 is an operation flowchart illustrating step S62 of detecting the code-injected virtual address space area of a certain process, which is illustrated in FIG. 6, in detail.

Step S62 of detecting the code-injected virtual address space area is performed as follows. The network access control system collects information about virtual address spaces that form processes at step S71. A single virtual address space is selected as an inspection-target virtual address space at step S72, and whether the memory type of the inspection-target virtual address space is a private type is inspected at step S73.

If it is determined at step S73 that the memory type of the inspection-target virtual address space is a private type, it is inspected whether the protect flag value of the inspection-target virtual address space is executable at step S74. If it is determined at step S74 that the protect flag value of the inspection-target virtual address space is executable, the inspection-target virtual address space is determined to be a code-injected area at step S75, the virtual address range information of the code-injected virtual address space is transferred to the code injection-based thread detection unit at step S76.

Thereafter, it is determined whether the inspection-target virtual address space is a last virtual address space at step S77. If the inspection-target virtual address space is not a last virtual address space, the process starting from step S72 is repeated. Meanwhile, if it is determined at step S73 that the memory type of the inspection-target virtual address space is not a private type or it is determined at step S74 that the protect flag value of the inspection-target virtual address space is not executable, the process directly proceeds to step S77.

Figure 8:
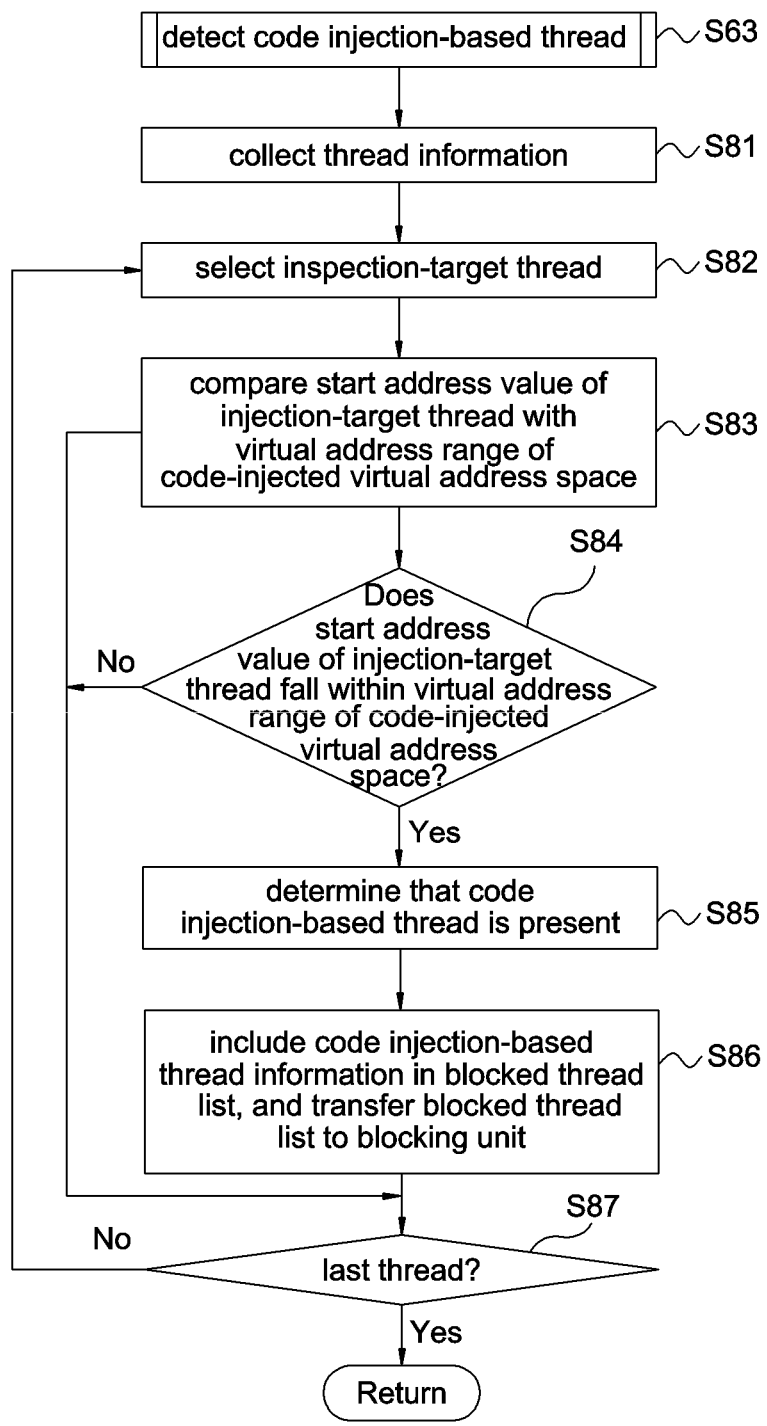
FIG. 8 is an operation flowchart illustrating step S63 of detecting a thread based on the code-injected virtual address space detected at step S62 of FIG. 6, that is, a code injection-based thread in detail.

FIG. 8 is an operation flowchart illustrating step S63 of detecting a thread based on the code-injected virtual address space detected at step S62 of FIG. 6, that is, a code injection-based thread in detail.

Step S63 of detecting the code injection-based thread is performed, as follows. The network access control system collects information about threads being executed on a computer at step S81. A single thread of the collected thread information is selected as an inspection-target thread at step S82, and it is determined through comparison whether the start address value of the inspection-target thread falls within the virtual address range of the code-injected virtual address space at step S83. If, as a result of the comparison at step S83, it is determined that the start address value of the inspection-target thread falls within the virtual address range of the code-injected virtual address space at step S84, it is determined that the code injection-based thread is present in the code-injected virtual address space at step S85, and the process and thread IDs of the code injection-based thread are included in a blocked thread list and then the blocked thread list is transferred to the network blocking unit at step S86. At step S86, the process and thread IDs of the code injection-based thread may be included in the blocked thread list after being verified by a user.

Thereafter, it is determined whether the inspection-target thread is a last thread at step S87, and, if the inspection-target thread is not a last thread, the process starting from step S82 is repeated. Meanwhile, if it is determined at step S84 that the start address value of the inspection-target thread does not fall within the virtual address range of the code-injected virtual address space, the process directly proceeds to step S87.

FIG. 9 is an operation flowchart illustrating step S65 of controlling a network packet using the code injection-based thread information detected at step S63 of FIG. 6 in detail.

Step S65 of controlling a network packet is performed, as follows. The network access control system collects at least one network packet transmitted or received by a computer by performing network filtering at step S91. Thereafter, the process and thread IDs of the collected network packet and overall path information are collected at step S92. If the process and thread IDs are included in a blocked thread list at step S93, the traffic of the collected network packet is blocked at step S94. If it is determined at step S93 that the process and thread IDs of the collected network packet are included in the blocked thread list, it is determined whether the process ID is included in an allowed process list at step S95. If it is determined at step S95 that the process ID is included in the allowed process list, the traffic of the collected network packet is allowed at step S96.

Meanwhile, if it is determined at step S95 that the process ID is not included in the allowed process list, the user verification of the process ID is requested at step S97. If it is determined at step S98 that the process ID is allowed by the user, the process ID of the collected network packet is included in the allowed process list at step S99 and then the traffic of the collected network packet is allowed at step S96. Meanwhile, if it is determined at step S98 that the process ID is not allowed by the user, the traffic of the collected network packet is blocked at step S94.

Although the technical spirit of the present invention has been described in conjunction with the accompanying drawings, this has described only the most preferred embodiments of the present invention by way of example, and is not intended to limit the present invention. Furthermore, it will be apparent to those having ordinary knowledge in the art that various modifications and variations are possible within the range that does not depart from the technical spirit of the present invention.

The invention claimed is:

1. A network access control system, comprising:
   a process inspection unit and a network inspection unit, the process inspection unit comprising:
      a process information collection unit configured to collect information about one or more processes being executed on a computer,
      a code injection detection unit configured to detect a code-injected area in the processes collected by the process information collection unit, and
      a thread detection unit configured to detect a thread generated based on the code-injected area to collect the code injection based-thread information, the network inspection unit comprising:
         a filter unit configured to filter the network packet, and
         a network blocking unit configured to block the traffic of the network packet if the agent of communication of the network packet is the code injection based-thread.

2. The network access control system of claim 1, wherein the process information collection unit collects an EProcess structure for each of the processes being executed on the computer.

3. The network access control system of claim 1, wherein the code injection detection unit comprises a virtual address space information collection unit configured to collect a virtual address range and attribute information of a virtual address space assigned to each of the collected processes, and a virtual address space inspection unit configured to inspect whether the virtual address space collected by the virtual address space information collection unit has been code-injected.

4. The network access control system of claim 3, wherein the virtual address space information collection unit collects the virtual address range and attribute information of the virtual address space assigned to each of the collected processes by inspecting a VadRoot member of an EProcess structure at a kernel level.

5. The network access control system of claim 3, wherein the virtual address space information collection unit collects the virtual address range and attribute information of the virtual address space assigned to each of the collected processes by using a VirtualQueryEx function at a user level.

6. The network access control system of claim 3, wherein the virtual address space inspection unit, if, in the attribute information of the virtual address space collected by the virtual address space information collection unit, a memory type is a private type and a protect flag value is executable, determines the virtual address space to be a code-injected area.

7. The network access control system of claim 1, wherein the code injection-based thread detection unit comprises a thread information collection unit configured to collect information about one or more threads being executed on the computer, and an address comparison unit configured to compare a start address value of each of the threads collected by the thread information collection unit with a virtual address range of a code-injected virtual address space provided the virtual address space inspection unit, and to, if the start address value of each of the collected threads falls within the virtual address range of the code-injected virtual address space, determine that a code injection-based thread is present in the code-injected virtual address space.

8. The network access control system of claim 7, wherein the thread information collection unit collects the information about one or more threads being executed on the computer by inspecting a ThreadListHead of the EProcess structure.

9. The network access control system of claim 7, wherein the thread information collection unit collects the information about one or more threads being executed on the computer by using a ZwQuerySystemInformation function.

10. The network access control system of claim 1, wherein the network filter unit performs network filtering by using a network filter driver at a kernel level.

11. The network access control system of claim 1, wherein the network filter unit performs network filtering by hooking a socket function used by each of the processes at a user level.

12. A network access control method, comprising:
   step 1 of collecting, by a network access control system, process information being executed on a computer;
   step 2 of detecting, by the network access control system, a code-injected area included in the collected process;
   step 3 of detecting, by the network access control system, the network to collect the network packets accessing the network;
   step 4 of filtering, by the network access control system, the network to collect the network packets accessing the network; and
   step 5 of blocking, by the network access control system, the traffic of the network packet if the agent of communication of the collected network packet is the code injection based-thread detected in the step 3.

13. The network access control method of claim 12, wherein step 1 comprises collecting an EProcess structure for each of the processes being executed on the computer.

14. The network access control method of claim 12, wherein step 2 comprises:
   step 21 of collecting, by the network access control system, information about a virtual address space assigned to each of the collected process;
   step 22 of selecting, by the network access control system, an inspection-target virtual address space and inspecting, by the network access control system, a memory type and protect flag value of the inspection-target virtual address space; and
   step 23 of, if, as a result of the inspection at step 22, it is determined that the memory type of the inspection-target virtual address space is a private type and the protect flag value is executable, determining the inspection-target virtual address space to be a code-injected area.

15. The network access control method of claim 14, wherein step 21 comprises collecting a virtual address range and attribute information of the virtual address space assigned to each of the collected processes by inspecting a VadRoot member of an EProcess structure at a kernel level.

16. The network access control method of claim 14, wherein step 21 comprises collecting a virtual address range and attribute information of the virtual address space assigned to each of the collected processes by using a VirtualQueryEx function 5 at a user level.

17. The network access control method of claim 12, wherein step 3 comprises:
   step 31 of collecting, by the network access control system, information about one or more threads being executed on the computer;
   step 32 of selecting, by the network access control system, an inspection-target thread and comparing, by the network access control system, a start address value of the inspection target thread with a virtual address range of the code-injected virtual address space; and step 33 of, if, as a result of the comparison at 32, it is determined that the start address value of the inspection-target thread falls within the virtual address range of the code-injected virtual address space, determining that a code injection-based thread is present in the code injected virtual address space.

18. The network access control method of claim 17, further comprising, after step 33, including process and thread IDs of the code injection-based thread in a blocked thread list.

19. The network access control method of claim 17, wherein step 31 comprises collecting the information about one or more threads being executed on the computer by inspecting a ThreadListHead of the EProcess structure.

20. The network access control method of claim 17, wherein step 31 comprises collecting the information about one or more threads being executed on the computer by using a ZwQuerySystemInformation function.

21. The network access control method of claim 12, wherein step 4 comprises performing network filtering by using a network filter driver 5 at a kernel level.

22. The network access control method of claim 12, wherein step 4 comprises performing network filtering by hooking a socket function used by each of the processes at a user level.

23. The network access control method of claim 12, wherein step 5 comprises:
   step 51 of storing, by the network access control system, process and thread IDs of the code injection-based thread in a blocked thread list;
   step 52 of collecting, by the network access control system, information about process and thread IDs of the collected network packet;
   step 53 of, once the process and thread IDs collected at step 52 have been included in the blocked thread list, blocking, by the network access control system, the traffic of the collected network packet; and
   step 54 of, if the process and thread IDs of the collected network packet are not included in the blocked thread list and the process ID is included in an allowed process list, allowing, by the network access control system, the traffic of the collected network packet.

24. The network access control method of claim 23, wherein step 51 comprises storing, by the network access control system, the process and thread IDs of the code injection-based thread in the blocked thread list after user verification has been performed.

* * * * *